C. B. Perkins.
Horse Rake.
No. 76,518.     Patented April 7, 1868.
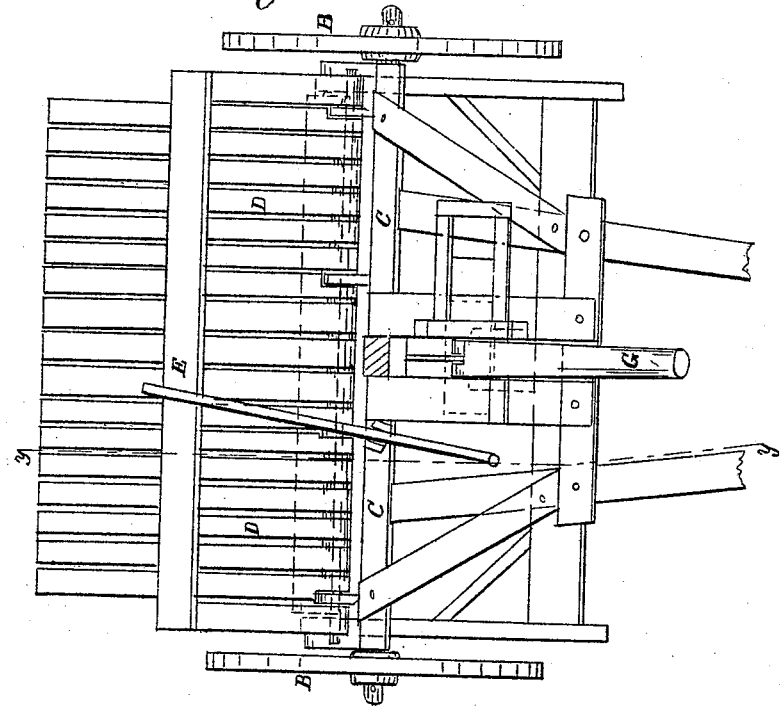
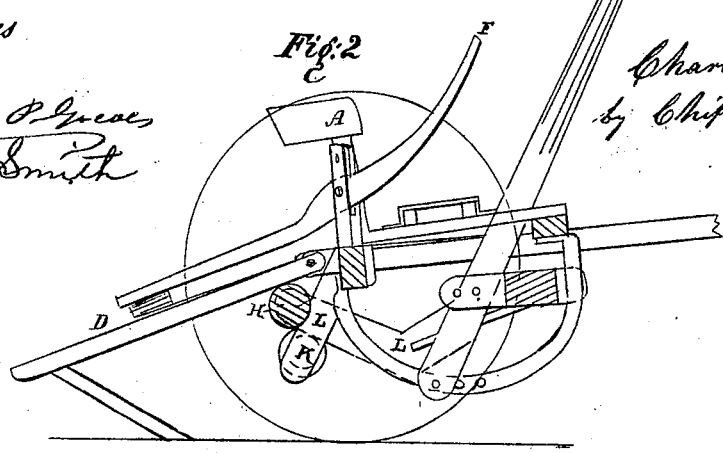
Witnesses
James P. Greves
J. C. Smith
Inventor
Charles B. Perkins
by Chipman, Hosmer &
his attys

United States Patent Office.

CHARLES B. PERKINS, OF KENDUSKEAG, ASSIGNOR TO HIMSELF AND BARNABAS BURSELEY, OF SANGERVILLE, MAINE

Letters Patent No. 76,518, dated April 7, 1868.

IMPROVEMENT IN HORSE-RAKES.

The Schedule referred to in these Letters Patent and making part of the same.

TO WHOM IT MAY CONCERN:

Be it known that I, CHARLES B. PERKINS, of Kenduskeag, in the county of Penobscot, and State of Maine, have invented a new and useful Improvement on a Horse-Rake; and I do hereby declare that the following is a full, clear, and exact description of the construction and operation of the same, reference being had to the annexed drawings, making a part of this specification, in which—

Figure 1 is a plan view, and

Figure 2 a transverse sectional view, following the course of the red line, as shown on fig. 1, letters $y\ y$.

Letter $a$ represents the driver's seat. Letters B B, the wheels. C, the axle-tree. D D, a series of independent fingers, with rake-teeth attached on the under side, in the manner shown in fig. 2. Letter E is a bar that rests upon the rake-fingers, attached to the machine in the manner shown in fig. 1. Letter F is a lever, contiguous to the driver's seat, and is used to press down the said bar E, and therewith said fingers, at the will of the driver. Letter G is a lever, by which the fingers and rake-teeth are raised, and the hay dropped, as hereafter described. Letter H is the lifting-roller, by which, in conjunction with lever G, said fingers are raised. Letters K are friction-rollers, upon which the knees L L move.

The object of my invention is to provide better means than have heretofore been known or used, for raking hay by horse-power.

To enable others skilled in the art to make and use my improvement, I will proceed to describe its construction and operation.

My device is constructed in the usual form of sulky horse-rakes, as represented on the drawings, with the additions and improvements hereinafter mentioned and described, viz:

Letter F is a lever, contiguous to the driver's seat, which is made to press upon the bar E, for the purpose of depressing the fingers, and keep them adjusted to the lifting-roller H. Letter G is a lever in front of the driver's seat, connected with the lifting-roller H by means of two knees L, moving on friction-rollers K, by which action the lifting-roller is made to roll steadily and firmly along the under side of the fingers, thus raising them, so as to discharge the hay in mass, in convenient distances upon the stubble, and by a reverse action of said lever G, the lifting-roller is restored to its original position, and the teeth are again ready to do their office of raking the hay into another bundle.

What I claim as my invention, and desire to secure by Letters Patent, is—

Lever G, knees L, friction-rollers K, and lifting-roller H, constructed, combined, and arranged substantially as described.

CHARLES B. PERKINS.

Witnesses:
WM. P. MINER,
A. W. LEAVITT.